No. 869,681. PATENTED OCT. 29, 1907.
H. W. C. ANNABLE.
MANUFACTURE OF FERROCHROMIUM.
APPLICATION FILED OCT. 31, 1906.
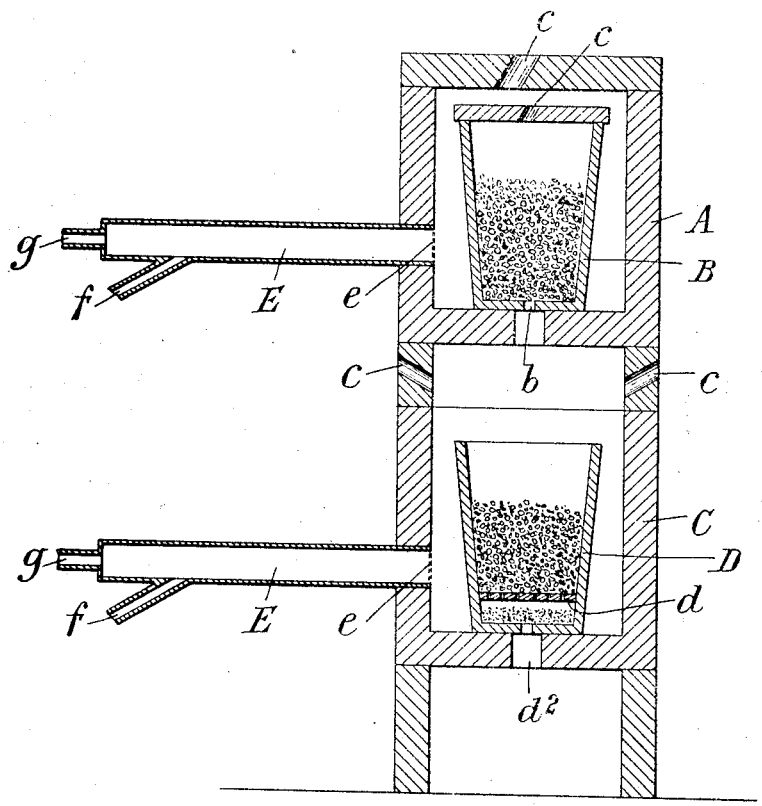
WITNESSES
INVENTOR
Henry William Coupe Annable
BY
Howson and Howson
ATTORNEYS

UNITED STATES PATENT OFFICE.

HENRY WILLIAM COUPE ANNABLE, OF BATTERSEA, LONDON, ENGLAND, ASSIGNOR TO THE FERRO ALLOYS SYNDICATE LIMITED, OF LONDON, ENGLAND.

MANUFACTURE OF FERROCHROMIUM.

No. 869,681.     Specification of Letters Patent.     Patented Oct. 29, 1907.

Application filed October 31, 1906. Serial No. 341,481.

*To all whom it may concern:*

Be it known that I, HENRY WILLIAM COUPE ANNABLE, a subject of the King of Great Britain and Ireland, residing at the Tungsten and Rare Metals Company Limited, Queen's Road, Battersea, in the county of London, England, chemist, have invented certain new and useful Improvements in the Manufacture of Ferrochromium, of which the following is a specification.

The object of this invention is to produce ferro-chromium containing little or no carbon, or other impurities, and obtained in a fused mass, or fused masses. If, for example, the initial material taken be chrome iron ore, (chromite), containing not less than fifty per cent. of chromium sesquioxid, I grind it finely and then I wash and concentrate it in any suitable concentrating machine in order to remove, as far as possible, the mechanically mixed impurities, such as silicious and earthy ingredients. With the ore thus treated I intimately mix carbonaceous material, (preferable ground anthracite), slightly in excess of the quantity theoretically required to reduce the chromic and iron oxids to the respective metals, and sufficient fluxing matter, (such as cryolite, borax, fluorspar, chlorid of calcium, or glass), to form a flux with the magnesia, alumina, and silica, in the ore, which flux will be fusible at a bright red heat. Alkaline fluxes should be avoided as they tend to absorb chromium, and this mixture I heat in a refractory receptacle. The crude fused ferro-chromium thus formed after cooling is removed from the receptacle and broken up.

In order to prepare ferro-chromium free, or practically free, from carbon from the crude ferro-chromium thus or otherwise prepared, I mix the crude ferro-chromium with pure oxid of iron, sufficient in quantity to make the proportion of the chromium in the mixture about equal to that of the total iron, calculated as metal. The quantity of carbon in this mixture must be in excess of the carbon necessary to reduce to metallic iron the whole of the oxid of iron mixed with the crude ferro-chromium. The mixture thus prepared is then introduced into a refractory receptacle oxid of iron being contained in a space, or receptacle, beneath the space or receptacle containing the mixture, so that the ferro-chromium, smelted with the mixture, will pass through the said oxid of iron. The mixture may for this purpose, be supported on a perforated false bottom leaving a space beneath for the oxid of iron, or the receptacle containing the mixture may be open at bottom and be mounted upon another refractory receptacle containing the oxid of iron. The receptacle, or receptacles, is, or are, then closed and heated to say a white heat (about from 1300° to 1400° centigrade): Owing to the higher temperature and to the additional iron formed by the reduction of the oxid of iron mixed with the charge, the crude ferro-chromium fuses. Meanwhile, the oxid of iron in the space at the bottom of the receptacle (or in the lower receptacle where that is used), attains the same, or a higher, temperature and the fused ferro-chromium when the necessary temperature is obtained, percolates through the said oxid of iron and is obtained as a fused mass. If the ferro-chromium contain carbon when it comes into contact with the hot oxid of iron beneath, this carbon reduces a proportionate amount of the oxid of iron to iron, which slightly raises the percentage of iron in the ferro-chromium.

If chromite be used as the initial material, the process may be carried out in one operation by mixing the ground washed and concentrated ore with oxid of iron, carbonaceous material and fluxing material, and heating the mixture to fusing point in the upper receptacle of a double arrangement of receptacles, the lower one containing oxid of iron as hereinbefore described.

The ferro-chromium must be in contact with the oxid of iron for a sufficient time to reduce all, or practically all, of the carbon present in the ferro-chromium, but not long enough for iron from the oxid of iron to replace chromium in the ferro-chromium to any material extent. This may be done by using the oxid of iron in a layer of such depth that examination of the product which has passed through it shows that all, or practically all, of the carbon has been removed, and that all, or practically all, of the original chromium in the ore is present in the refined product.

Outlets for the escape of gas will be provided. The ferro-chromium can be allowed to collect and solidify in the lower space, or receptacle, or it can be run off therefrom through a tap-hole.

The accompanying drawing represents apparatus adapted for the purposes of this invention.

A is an upper furnace containing a crucible B, and C is a lower furnace containing a crucible D. These furnaces are each heated by a burner E provided with wire gauze at $e$, and with inlets for coal gas and air respectively at $f$ and $g$.

The upper crucible B contains the ferro-chromium with carbon in admixture with oxid of iron, and has an opening $b$ through which the molten ferro-chromium descends in contact with oxid of iron supported on the perforated support $d$ in the crucible D, the purified ferro-chromium running out by the tap hole $d^2$.

$c$ are outlets for gas.

I claim as my invention

1. The process of manufacturing ferro-chromium substantially free from carbon which consists in smelting crude ferro-chromium in the presence of carbon and oxid of iron and out of contact with the products of combustion and then passing the molten ferro-chromium through a bed of oxid of iron to reduce the carbon present, substantially as described.

2. The process of manufacturing ferro-chromium substantially free from carbon which consists in smelting crude ferro-chromium in the presence of carbon and oxid of iron and out of contact with the products of combustion and then passing the molten ferro-chromium in a continuous stream through a bed of oxid of iron to reduce the carbon present, substantially as described.

3. The process of manufacturing ferro-chromium substantially free from carbon which consists in smelting crude ferro-chromium in the presence of carbon and oxid of iron and out of contact with the products of combustion and over a bed of oxid of iron and then dropping the molten ferro-chromium in a continuous stream through the said bed of oxid of iron to reduce the carbon present, substantially as described.

In testimony whereof I have signed this specification in the presence of two subscribing witnesses.

HENRY WILLIAM COUPE ANNABLE.

Witnesses:
WILLIAM GERALD REYNOLDS,
GILBERT FLETCHER TYSON.